(12) United States Patent
Lussier

(10) Patent No.: US 7,090,173 B2
(45) Date of Patent: Aug. 15, 2006

(54) PARA-SEISMIC SUPPORT FOR PIPES

(75) Inventor: Serge Lussier, Laval (CA)

(73) Assignee: Supports SCH Inc., Quebec (CA)

( * ) Notice: Subject to any disclaimer, the term of this patent is extended or adjusted under 35 U.S.C. 154(b) by 0 days.

(21) Appl. No.: 10/704,092

(22) Filed: Nov. 7, 2003

(65) Prior Publication Data

US 2004/0169113 A1 Sep. 2, 2004

(30) Foreign Application Priority Data

Nov. 7, 2002 (CA) .................................. 2411500

(51) Int. Cl.
E21F 17/02 (2006.01)
B66C 1/12 (2006.01)

(52) U.S. Cl. .................... 248/58; 248/62; 248/74.1; 294/74

(58) Field of Classification Search ............... 248/58, 248/693, 60, 62, 63, 67.7, 74.1, 61; 294/74
See application file for complete search history.

(56) References Cited

U.S. PATENT DOCUMENTS

| | | | | |
|---|---|---|---|---|
| 447,297 A * | 3/1891 | Carpenter | ........ | 248/58 |
| 2,603,523 A * | 7/1952 | Cameron | ........ | 294/74 |
| 2,618,450 A | 11/1952 | Thomas | ........ | 248/74 |
| 2,923,509 A * | 2/1960 | Kolodin | ........ | 248/62 |
| 2,942,820 A * | 6/1960 | Sherburne | ........ | 248/62 |
| 3,370,815 A | 2/1968 | Opperthauser | ........ | 248/74 |
| 3,570,794 A | 3/1971 | Kirschner | ........ | 248/74 |
| 3,653,618 A | 4/1972 | Kindorf et al. | ........ | 248/58 |
| 3,687,406 A * | 8/1972 | Krahe et al. | ........ | 248/55 |
| 3,744,837 A * | 7/1973 | Foster | ........ | 294/74 |
| 3,895,496 A * | 7/1975 | Perrott et al. | ........ | 29/720 |
| 3,941,412 A * | 3/1976 | Carpenter | ........ | 294/74 |
| 4,046,169 A | 9/1977 | Pollono et al. | ........ | 138/106 |
| 4,078,752 A | 3/1978 | Kindorf | ........ | 248/62 |
| 4,101,118 A | 7/1978 | Mottola et al. | ........ | 267/136 |
| 4,134,563 A | 1/1979 | Pollono | ........ | 248/58 |
| 4,143,844 A | 3/1979 | Van Meter | ........ | 248/62 |
| 4,440,369 A * | 4/1984 | Banks | ........ | 248/62 |
| 4,530,478 A | 7/1985 | McClellan | ........ | 248/62 |
| 4,601,449 A | 7/1986 | Sharbaugh | ........ | 248/58 |
| 4,679,755 A | 7/1987 | Marsault et al. | ........ | 248/74.1 |
| 4,697,770 A | 10/1987 | Kirschner | ........ | 248/62 |
| 4,804,158 A | 2/1989 | Collins et al. | ........ | 248/74.4 |
| 4,852,848 A | 8/1989 | Kucera | ........ | 248/559 |
| 5,029,781 A * | 7/1991 | Schneiderat | ........ | 248/62 |
| 5,039,039 A | 8/1991 | Schaffer | ........ | 248/59 |
| 5,295,646 A | 3/1994 | Roth | ........ | 248/58 |
| 5,718,095 A | 2/1998 | Kemeny | ........ | 52/698 |
| 5,897,088 A | 4/1999 | Kirschner | ........ | 248/300 |

(Continued)

FOREIGN PATENT DOCUMENTS

GB 2127126 4/1984

*Primary Examiner*—Anita M. King
(74) *Attorney, Agent, or Firm*—Baker & Daniels LLP

(57) ABSTRACT

A para-seismic support for pipes is disclosed. The support has two support members, each for supporting an end of a pipe on either side of a mechanical joint. The support members are joined to each other. The support is provided with a plurality of holes, at least one of which is for supporting the pipes, and at least one of which is for providing para-seismic protection by attaching the support to a ceiling and by attaching said support to a structure at an angle of no more than 90° from a vertical direction.

7 Claims, 4 Drawing Sheets

U.S. PATENT DOCUMENTS

| | | | |
|---|---|---|---|
| 5,967,480 A | 10/1999 | Kirschner | 248/300 |
| 6,021,981 A * | 2/2000 | Leebeeck | 248/58 |
| 6,032,907 A | 3/2000 | Santa Cruz et al. | 248/60 |
| 6,098,942 A | 8/2000 | Heath | 248/228.6 |
| 6,135,397 A | 10/2000 | Santa Cruz et al. | 248/74.1 |
| 6,353,988 B1 | 3/2002 | Smith et al. | 29/446 |
| 6,454,232 B1 | 9/2002 | Roth | 248/228.1 |
| 6,557,805 B1 * | 5/2003 | Snyder | 248/60 |

* cited by examiner

PARA-SEISMIC SUPPORT FOR PIPES

FIELD OF THE INVENTION

The present invention relates to a para-seismic support for pipes, and more particularly to such pipes used for plumbing purposes.

DESCRIPTION OF THE PRIOR ART

It is well known in the art to provide supports for pipes. Such supports usually include a support member on each side of a mechanical joint joining two pipes. The support member is then linked to a permanent structure, such as the ceiling, in order to provide adequate support for the pipes.

However, such supports do not provide any protection against seismic tremors, or any lateral shock applied to the pipes, which could result in failure of the mechanical joint.

SUMMARY OF THE INVENTION

It is an object of the present invention to provide a para-seismic support for pipes. The support has at least two support members, each for supporting an end of a pipe on either side of a mechanical joint. The support members are joined to each other through joining means. The support is provided with a plurality of holes, for supporting the pipes, and for providing para-seismic protection.

BRIEF DESCRIPTION OF THE DRAWINGS

The present invention and its advantages will be more easily understood after reading the following non-restrictive description of preferred embodiments thereof, made with reference to the following drawings in which.

DESCRIPTION OF A PREFERRED EMBODIMENT OF THE INVENTION

The present invention is directed to a para-seismic support for pipes, such as plumping pipes.

Figure 1:
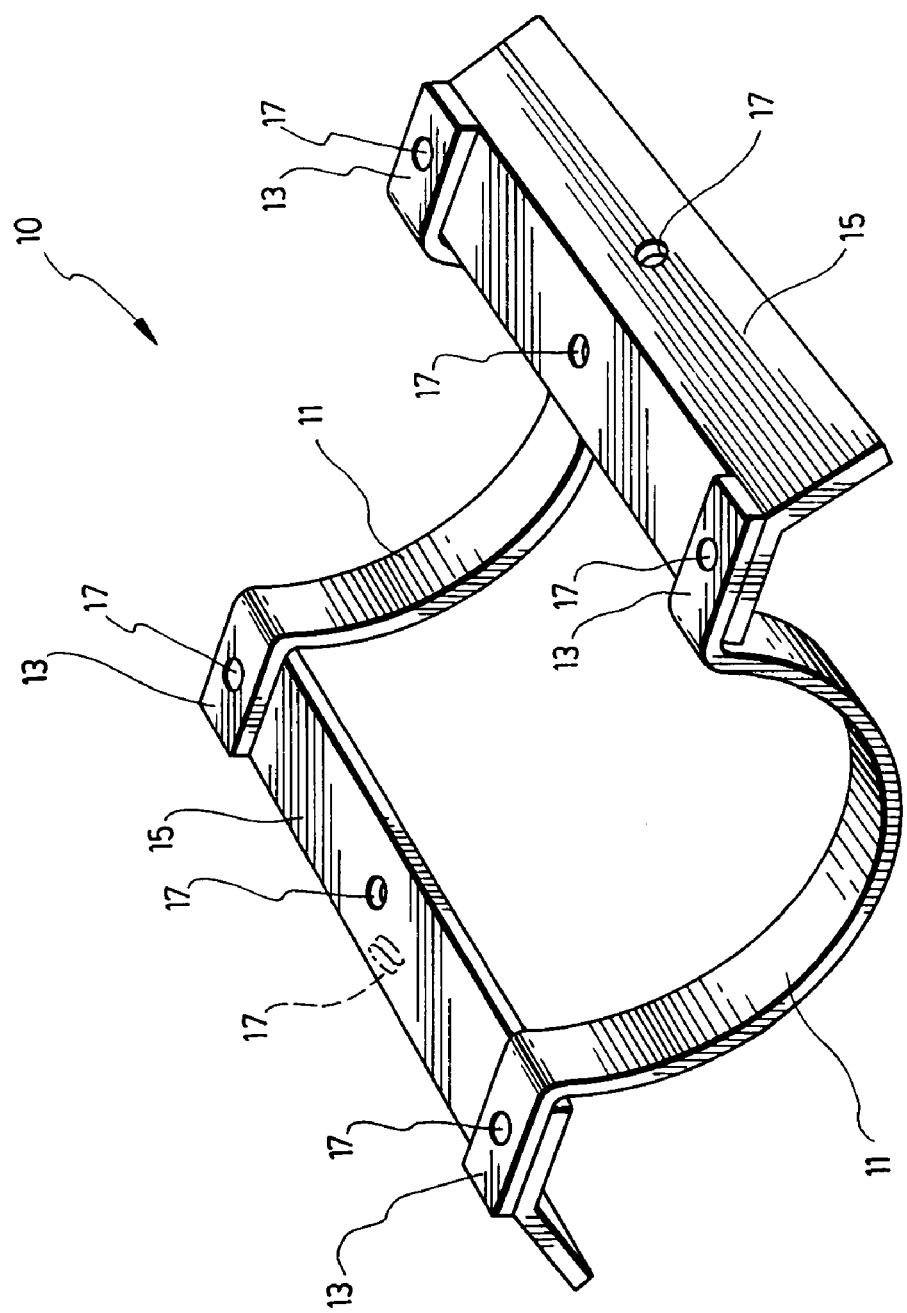
FIG. 1 is a perspective view of a support according to a first preferred embodiment of the invention.
Figure 3B:
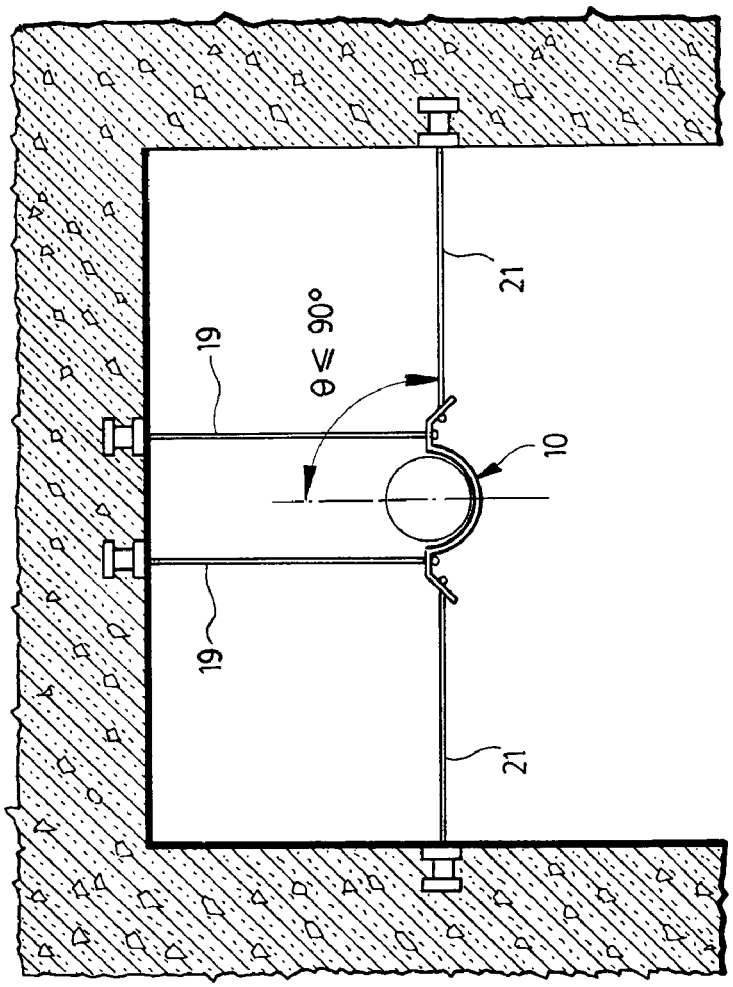
FIGS. 3a and 3b are respectively front and side views of an installed support according to a first preferred embodiment of the invention.
Figure 3A:
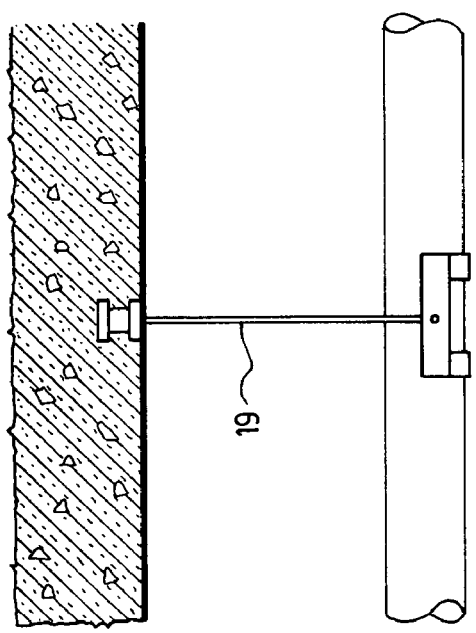

Referring now to FIG. 1, there is shows a support 10 according to a first preferred embodiment of the invention. The support 10 has two supports members 11 in the shape of a half-circle, and each support member 11 is provided with flanges 13. The support members 11 are joined to each other through longitudinal brackets 15. The brackets are soldered or otherwise fastened to the flanges 13 on their underside. The support 10 is provided with a plurality of holes 17. At least one of the holes is used for supporting the pipes, and more preferably, two holes are used for this purpose, as shown in FIGS. 3a and 3b, where lines 19 are support lines. At least one, but preferably at least two, holes are used for para-seismic support, as shown by lines 21, which extend at an angle of no more than 90° from a vertical line, as shown in FIG. 3b. The anchoring of the pipe in this manner provides for adequate support, as well as para-seismic protection.

It will be understood that the lines can be wires, cords, twisted wires, chains, etc., depending on the requirements of a particular installation, and that any such means will meet the objects of the invention.

It will be recognized by a person skilled in the art that the support 10 can be manufactured in different sizes, to accommodate different pipes, and from different materials. Furthermore, the length of the support 10 is preferably adapted to avoid any interference with the mechanical joint joining two pipes.

Figure 2A:
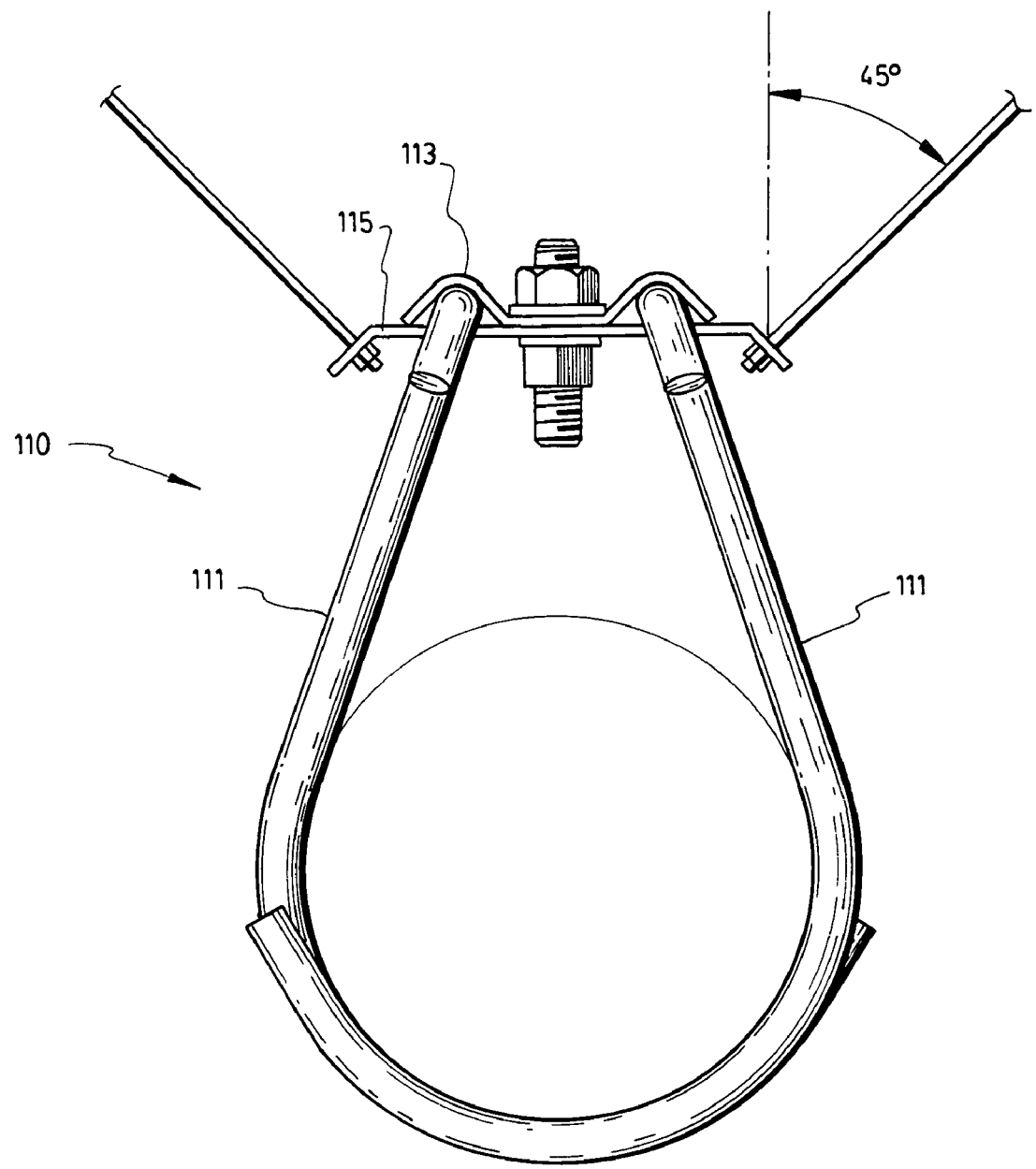
FIGS. 2a, 2b and 2c are respectively a front view of a support according to a second preferred embodiment of the invention in use; a front view of one of said support members; and a side view of one of said support members.
Figure 2C:
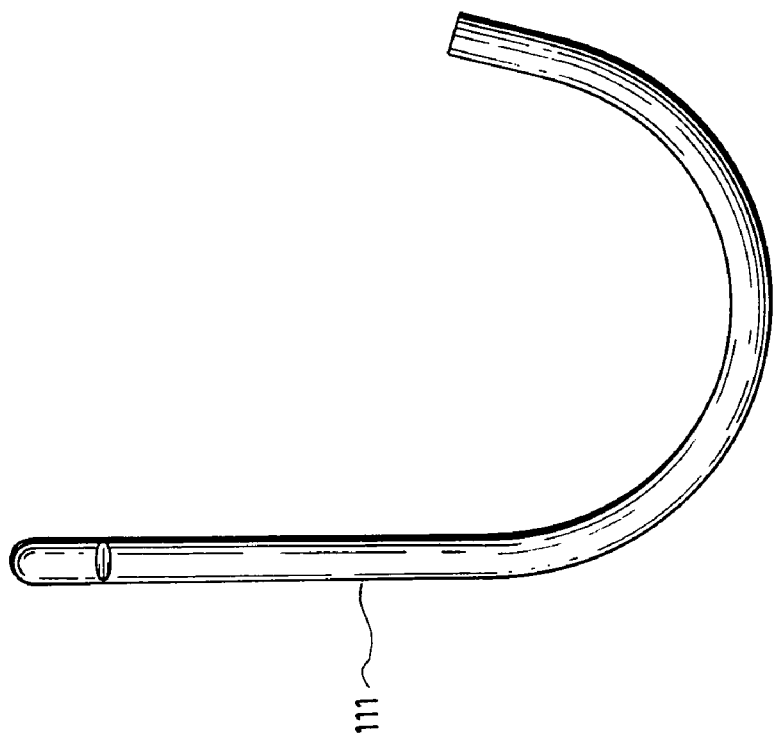
Figure 2B:
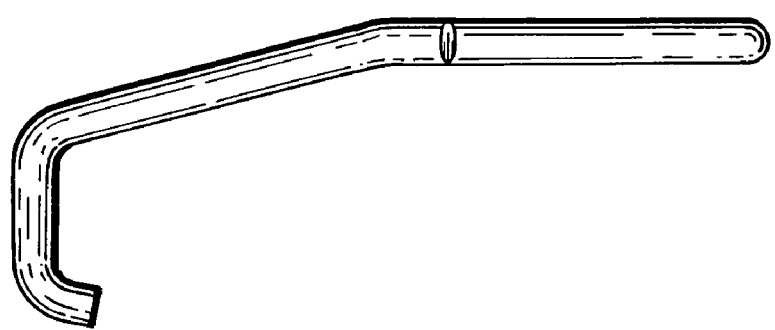

An alternative embodiment of the support 110 is shown in FIGS. 2a and 2b. There, the support members 111 have a curved shape, or a J-shape, and the members extend upwardly. The members are secured together with a joining bracket 113 which is fastened on top of a support bracket 115. The support bracket 115 is provided with two downwardly sloping flanges, each having a hole. In this case, the holes have a dual purpose: supporting the pipes, and for providing anti-seismic protection. Thus, each side of the bracket 115 is fixed to a structure such as a ceiling with lines extending at an angle, which is between 35° and 45° (although it does not need to be absolutely 35° as will be appreciated by a person skilled in the art, and in fact could be another angle, but 35° is the optimal solution although 45° is shown in the drawings). For more support, a substantially vertical line may also be provided, which is attached to the bolt securing the brackets 113, 115.

The function of simultaneously providing support and para-seismic protection with 35° lines also provides an additional advantage: if more weight is put on the pipes, the angle of the lines will force bracket 115 towards bracket 113, thereby preventing the creation of an opening between the two, which could have resulted in the J-shapes detaching themselves from the joining means.

As in the previous embodiment, the support 110 can be manufactured in different sizes, to accommodate different pipes. Furthermore, the distance between the two support members is adapted to avoid any interference with the mechanical joint joining the two pipes.

In a preferred embodiment, the second embodiment is preferably used from pipes having a diameter up to 6 inches, and the first embodiment, given its sturdier construction, can be used for pipes having a diameter of up to 24 inches. It will be understood that greater diameters can be support with a corresponding increase in strength of the support.

Although the present invention has been explained hereinabove by way of a preferred embodiment thereof, it should be pointed out that any modifications to this preferred embodiment within the scope of the appended claims is not deemed to alter or change the nature and scope of the present invention. For example, although the para-seismic support has been shown with two support members, some environments may require more support members on either side of the mechanical joint of the pipes, such as for a sturdier construction. Furthermore, although the first embodiment has been shown with substantially perpendicular lines, 45° lines may also be used, if the circumstances so warrant.

The invention claimed is:

1. A permanent para-seismic support for generally horizontal pipes, comprising:
   at least two support members, each of said support members being adapted to support an end of a pipe on either side of a mechanical joint; said support members being joined to each other through joining means, said joining means being provided with a plurality of holes, said holes being adapted to suspend the support from a ceiling, and providing para-seismic protection, wherein said para-seismic protection is achieved through at least one line extending at an angle of at most 90° from a vertical direction, and connected to said at least one of said plurality of holes adapted to provide para-seismic protection and to a structure.

2. A para-seismic support according to claim 1, wherein said support members are in the shape of a half-circle for receiving a respective pipe therein, said joining means including opposite flanges integrally formed to said support members and including two longitudinal brackets for respectively joining an opposite flange of each of said support members, said longitudinal brackets being affixed to the underside of said opposite flanges.

3. A para-seismic support according to claim 2, wherein said longitudinal brackets are soldered to said opposite flanges.

4. A para-seismic support according to claim 2, wherein said joining means include four holes, at least two of which for providing support and at least one of which for providing para-seismic protection.

5. A permanent para-seismic support for generally horizontal pipes, comprising:

at least two support members, each of said support members being adapted to support an end of a pipe on either side of a mechanical joint; said support members being joined to each other through joining means, said joining means being provided with a plurality of holes, said holes being adapted to support suspend the from a ceiling, and providing para-seismic protection, wherein each of said support members are generally J-shaped; an interior edge of said J-shapes is structured and arranged to support pipes and said joining means is adapted to lie above pipes; and wherein said joining means are provided with two downwardly extending, opposite flanges.

6. A para-seismic support according to claim 5, wherein said J-shapes have opposite openings.

7. A para-seismic support according to claim 5, wherein said flanges are at a 35° angle and are each provided with a hole for receiving a line attached at a 35° angle, thereby providing support and para-seismic protection simultaneously.

* * * * *

UNITED STATES PATENT AND TRADEMARK OFFICE
CERTIFICATE OF CORRECTION

PATENT NO. : 7,090,173 B2
APPLICATION NO. : 10/704092
DATED : August 15, 2006
INVENTOR(S) : Serge Lussier It is certified that error appears in the above-identified patent and that said Letters Patent is hereby corrected as shown below:

Column 4, line 6, delete "support suspend the" and insert --suspend the support--

Signed and Sealed this

Fourteenth Day of November, 2006

JON W. DUDAS
*Director of the United States Patent and Trademark Office*